United States Patent [19]

Mathews

[11] 3,769,524

[45] Oct. 30, 1973

[54] TRANSISTOR SWITCHING CIRCUIT

[75] Inventor: Keith Franklin Mathews, Wappingers Falls, N.Y.

[73] Assignee: International Business Machines Corporation, Armonk, N.Y.

[22] Filed: June 27, 1972

[21] Appl. No.: 266,847

[52] U.S. Cl. .................. 307/215, 307/207, 307/214, 307/218, 307/300

[51] Int. Cl. . H03k 19/34, H03k 19/36, H03k 19/40

[58] Field of Search .................... 307/207, 213, 214, 307/215, 218, 299, 300, 317; 330/29, 110

[56] References Cited

UNITED STATES PATENTS

| | | | |
|---|---|---|---|
| 2,997,577 | 8/1961 | Kaminski | 307/214 X |
| 3,200,343 | 8/1965 | Skinner | 307/300 X |
| 3,287,577 | 11/1966 | Hung et al. | 307/215 |
| 3,406,296 | 10/1968 | Huttenhoff et al. | 307/215 |
| 3,450,896 | 6/1969 | Taniguchi et al. | 307/218 |
| 3,463,975 | 8/1969 | Biard | 307/317 X |
| 3,515,900 | 6/1970 | Smythe | 307/215 |
| 3,528,017 | 9/1970 | Zussman | 307/215 X |
| 3,654,490 | 4/1972 | Kan | 307/262 X |
| 3,699,362 | 10/1972 | Jordan | 307/300 |

FOREIGN PATENTS OR APPLICATIONS

| | | | |
|---|---|---|---|
| 1,081,049 | 5/1960 | Germany | 307/215 |

OTHER PUBLICATIONS

Kronlage, "Schottky Clamped TTL", Texas Instruments, Inc., published by I.E.E.E.; 3/1971, 2 pages.

*Primary Examiner*—John W. Huckert
*Assistant Examiner*—L. N. Anagnos
*Attorney*—Kenneth R. Stevens et al.

[57] ABSTRACT

A bistable transistor switching circuit comprising a bipolar transistor adapted to switch states in response to a base node voltage. The circuit further comprises two negative feedback paths. The first comprises a voltage feedback path in which the potential at the transistor emitter terminal responds to a change in emitter current, and the other feedback path comprises a current feedback path through a non-linear impedance located between collector and base terminals.

17 Claims, 10 Drawing Figures

TRANSISTOR SWITCHING CIRCUIT

BACKGROUND OF THE INVENTION

This invention relates to a transistor switching circuit for logic applications, and more specifically, to circuits ideally suited for large scale integration (LSI) on a single semiconductor substrate.

Transmission line distances on an LSI chip are extremely small. Therefore, there is generally no need for circuits which communicate internally to have the ability to drive a low impedance normally associated with transmission lines in order to obtain ideal switching transient transmission over relatively long distances. Thus, the trend is to use low power-high speed internal circuits in combination with high power driver circuits in order to provide off-chip driving signals. Similarly, this limitation may necessitate special receiver circuits located on the chip in order to accept signals from driver circuits located external to the chip.

SUMMARY OF THE INVENTION

The present invention provides a basic internal logic circuit consisting of one bipolar transistor and one diode, readily integratable into the bipolar transistor, and a pair of resistors for a logical input signal to the logic circuit. Numerous variations of the basic logic circuit allow the present invention to be used with many well-known higher power bipolar logic drivers and higher power bipolar logic receivers, and also to be intermixed with field effect transistor circuits. Advantageously, the driver, receiver and field effect transistors are able to utilize the identical power supply used for the basic internal logic circuit of the present invention. Furthermore, the basic logic circuit is simple in design and hence can be implemented in integrated circuit form with high density and high yield results.

More specifically, the present invention employs compound negative feedback. One negative feedback path is provided by a Schottky barrier diode located between the base and collector terminals. The basic logic circuit operates at high speeds and with minimum power requirements in contrast to other well known logic switching circuits. Measured speeds of less than three nanoseconds at 1.5 miliwatts are obtainable for transistors having a common emitter gain-bandwidth product of greater than 0.5 GHZ.

The combination of an emitter-to-base feedback path by virtue of emitter degeneration, and a collector-to-base feedback path by means of a forward biased Schottky diode results in a basic internal logic switching circuit possessing a well-defined voltage threshold and which further is capable of generating exceptionally stable voltage levels. The compound feedback prevents a significant variation or degradation of these voltage levels over a wide range of loading, resistor variation, and transistor gain variation. Moreover, since an up input voltage level to the basic logic circuit resides at a point which is a conducting Schottky diode voltage drop above the output down level generated from the logic circuit, signal swings exhibit little variation in amplitude, and track extremely well with power supply variations so as to maintain an extremely stable noise tolerance level.

Therefore, it is an object of the present invention to provide an improved bistable transistor logic switching circuit for use in LSI applications.

Another object of the present invention is to provide a bipolar transistor logic switching circuit configuration which is flexible in design and can be used with many different types of other logic switching circuits.

Still another object of the present invention is to provide a bipolar logic switching circuit which is extremely stable.

A further object of the present invention is to provide a bipolar transistor logic switching circuit possessing negligible loading effect on the driving circuit preceding it.

Another object of the present invention is to provide a bipolar transistor logic switching circuit in which transistor gain variations result in negligible effect on the input and output levels generated by the circuit.

Another object of the present invention is to provide a bipolar transistor logic switching circuit which compensates for resistor value variations.

A further object of the present invention is to provide a bipolar transistor logic switching circuit wherein signal swings and noise tolerance levels are relatively independent of the power supply.

Another object of the present invention is to provide a bipolar transistor logic circuit which provides good operating results with only a single low level power supply, for example, less than 2 volts.

In accordance with the aforementioned objects, the present invention provides a bipolar transistor logic switching circuit comprising a bipolar transistor in combination with compound feedback paths.

The foregoing and other objects, features and advantages of the invention will be apparent from the following more particular description of the preferred embodiment of the invention as illustrated in the accompanying drawings.

DESCRIPTION OF THE PREFERRED EMBODIMENTS

Figure 1:
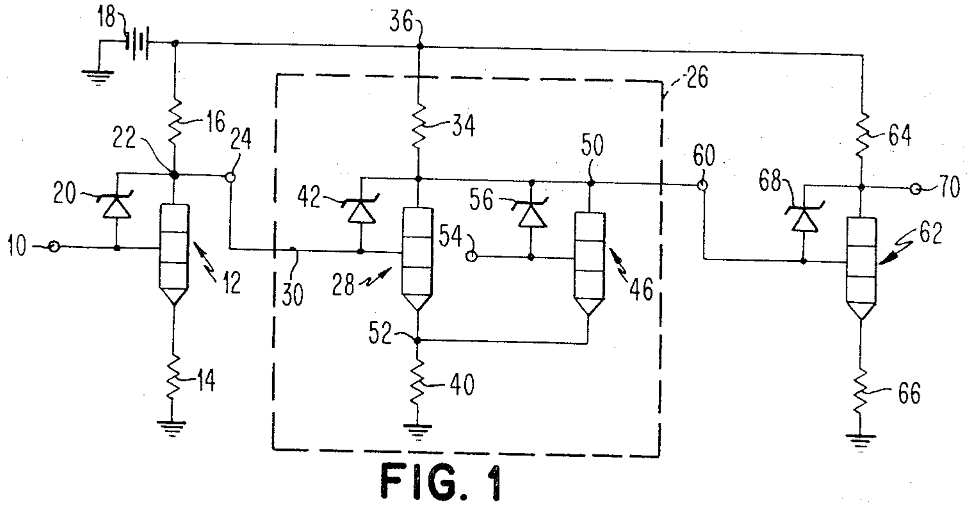
FIG. 1 is an electrical schematic diagram illustrating three cascaded basic internal logic circuits constructed in accordance with the basic principle of the present invention. The portion enclosed in dashed lines is a two-input NOR block.

Now referring to FIG. 1, it illustrates three cascaded stages constructed according to the present invention. The input stage comprises an input terminal 10 connected to the base of transistor 12. The emitter of transistor 12 is connected via resistor 14 to ground potential. The collector of transistor 12 is connected by means of resistor 16 to a potential source 18, which is in turn connected to ground potential. A Schottky barrier diode 20 is connected at its anode to the base terminal of transistor 12 and at its cathode to the collector terminal at node 22.

An output terminal 24 from the input stage is connected to an intermediate NOR stage depicted at 26. Output terminal 24 is connected to the base terminal of transistor 28 via line 30. The collector terminal of transistor 28 is connected via resistor 34 to the voltage source 18 at node 36. The emitter terminal of transistor 28 is connected to ground potential through a resistor 40. As in the first stage, a Schottky barrier diode 42 is connected between the base and collector terminal of transistor 28. The collector and emitter terminals of a bipolar transistor 46 are connected across the collector and emitter terminals of transistor 28 at a pair of nodes 50 and 52, respectively. A logic signal input terminal to transistor 46 is provided by line 54, and a Schottky barrier diode 56 is also connected between the base and collector terminals of transistor 46.

An output signal from the intermediate stage is generated at output terminal 60 which in turn is connected to the base terminal of a third stage bipolar transistor device 62. The collector terminal is connected to the voltage supply 18 via resistor 64 and the emitter terminal is connected to ground potential through resistor 66. A Schottky barrier diode 68 is connected across the base-collector terminals of transistor 62, and an output signal is generated from the final stage at output terminal 70, connected to the collector of transistor 62.

OPERATION

With a down level signal applied to input terminal 10 of the first stage, the base to emitter potential of transistor 12 is sufficiently low so as to maintain it in a nonconducting or off state. Therefore, Schottky barrier diode 20 is also in a non-conductive state. The potential at output terminal 24 is therefore free to rise toward the potential of power supply 18 up until a point when the transistor 28 in the intermediate stage begins to turn on and conduct current therethrough. As transistor 28 begins to conduct, current flows into its base terminal and also through Schottky barrier diode 42 so as to create a potential difference across resistor 16. This operation limits the potential at output terminal 24 to a level somewhat below that of the power supply 18, which in turn corresponds to an up level input being applied via line 30 to the NOR block 26.

With an up level signal applied to output terminal 24, and a down level signal applied to the input line 54 connected to the base of transistor 46, the potential at output node 60 falls as transistor 28 begins conducting. With an up level established at output terminal 24 from the first stage, a down level is established at output terminal 60 which is at a level corresponding to a conducting Schottky barrier diode voltage drop below the established up level. As a result, the base to emitter voltage across transistor 62 is low enough to keep it out of conduction and therefore, the voltage and current established at the output stage are identical to those previously established at the input stage, assuming that output terminal 70 is connected to the base terminal of a transistor (not shown) corresponding to the input stage, and that all the electrical components possess similar electrical characteristics.

The following specifications are provided as an illustration of the magnitude and direction of the parameters for the circuit of FIG. 1, simply for the purpose of aiding and understanding and practicing the invention. They should not be construed as a limitation on such circuitry, or as necessarily representing an optimum design.

Transistors 12, 28, 46, 62 – NPN, $f_t > 0.6$ GHZ, with a maximum of 0.85 volt, base to emitter voltage drop with 2 miliamperes collector current, and a $V_{cb\ min}$ of −.66 volts at 3 milliamperes emitter current with 0.15 milliamperes of current flowing into the base.

Diodes 20, 42, 56, 68 – Cu-Al to Si Schottky type with a maximum anode to cathode voltage drop of 0.51 volts at 0.5 ma. diode current.

| | |
|---|---|
| Supply 18 | 1.25 volts |
| Resistors 16, 34, 64 | 500 ohms |
| Resistors 14, 40, 66 | 100 ohms |
| Up level at terminals 24, 70 | 1.02 volts |
| Down level at terminals 10, 54, 60 | 0.530 volts |
| Delay of NOR block (terminals 24 to 60) positive going signal on 24 | 2.6 Nsec. |
| Delay of NOR block (terminals 24 to 60) negative going signal on 24 | 1.9 Nsec. |

Figure 2:
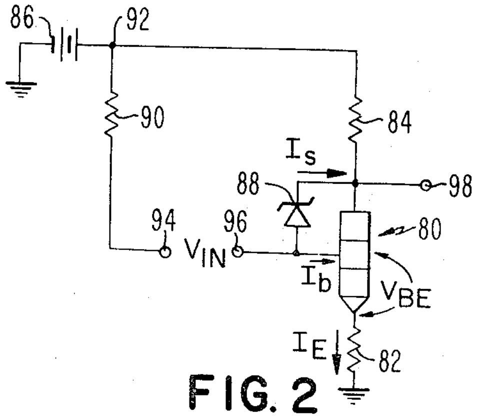
FIG. 2 is an electrical schematic diagram illustrating one of the basic circuits with the feedback path broken.

The circuit of FIG. 1 offers several significant advantages which are not immediately apparent. The most unique advantage is that afforded by the compound negative feedback inherent in the circuit. In order to illustrate the compound negative feedback, a portion of the FIG. 1 circuitry is broken out and redrawn in FIG. 2. FIG. 2 essentially corresponds to the intermediate stage previously described in FIG. 1 with transistor 46 and its associated diode 56 removed from the circuit since they remain in a non-conductive state and thus are not electrically active as long as a down level is applied to terminal 54.

The circuit in FIG. 2 comprises a bipolar transistor 80 whose emitter terminal is connected by way of resistor 82 to ground potential. The collector terminal of transistor 80 is connected by means of resistor 84 to a supply voltage 86 which in turn is connected to ground potential. A Schottky barrier diode 88 is connected across the base collector terminals of transistor 80. A resistor 90 is connected between node 92 connected to the power supply 86, and a terminal 94. The feedback paths extending from terminal 98 through diode 88 and resistor 90, and from the emitter of transistor 80 through the emitter-to-base junction of transistor 80 and resistor 90 are broken at a point where they become concurrent, thus creating terminals 94 and 96 in order to represent the application of a voltage $V_{IN}$ so as to obtain the open-loop gain characteristic of the circuit. An output voltage $V_{OUT}$ is developed at output terminal 98 connected to the collector terminal of transistor 80.

Figure 3:
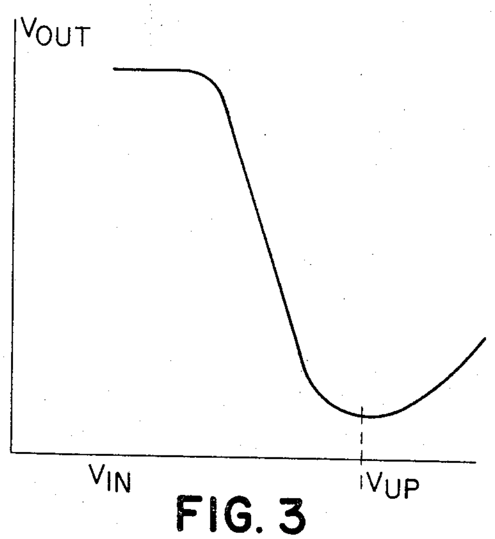
FIG. 3 is a voltage plot illustrating the open-loop gain curve for the circuit illustrated in FIG. 2.

The characteristic of the circuit schematically depicted in FIG. 2 from an open-loop gain standpoint is illustrated in FIG. 3. Initially, it is assumed that a steadily increasing potential, $V_{IN}$, is applied at terminal 96 with respect to ground from a beginning value of 0.0 volts. As $V_{IN}$ increases, transistor 80 comes into conduction and $V_{OUT}$ begins falling from a potential level somewhat near that of the power supply voltage 86 as current flow increases through resistor 84. When the voltage on terminal 98 becomes sufficiently negative with respect to the input voltage $V_{IN}$, Schottky barrier diode 88 begins conducting and forms a low impedance path between the input and output terminals. As a minimum value of $V_{OUT}$ is reached, and as $V_{IN}$ continues to increase, the output voltage $V_{OUT}$ begins to follow the input voltage as the coupling through the low impedance Schottky barrier diode path becomes dominant. This is graphically illustrated in FIG. 3.

It is now assumed that terminals 94 and 96 are connected and that a transistor in a previous stage, for example, a transistor corresponding to transistor 12 shown in FIG. 1, is in a non-conductive state so that any current flowing through resistor 90 in FIG. 2, corresponding to resistor 16 in FIG. 1, must necessarily flow into the base terminal of transistor 80 and into the anode terminal of Schottky barrier diode 88.

As $V_{IN}$ increases beyond a voltage value, hereinafter referred to as $V_{UP}$, and corresponding to a voltage value which establishes a minimum value of $V_{OUT}$, then both $V_{IN}$ and $V_{OUT}$ are increasing in value. During these conditions, the current through resistor 84 is decreasing, and since $V_{IN}$ is also increasing, the emitter current of transistor 80 and the potential drop across resistor 82 is also increasing.

However, at this point, the compound negative feedback is a factor and as a result begins decreasing the emitter current of transistor 80 so as to bring $V_{IN}$ back to $V_{UP}$. The only path for increasing current into transistor 80 is through the Schottky barrier diode 88 and resistor 90. The increased current flow through resistor 90 tends to drive $V_{IN}$ more negative. Simultaneously therewith, increasing current flow through resistor 82 tends to drive the emitter of transistor 80 more positive. As a result, the overall base-to-emitter voltage applied to transistor 80 is decreased due to this push-pull effect so as to force emitter current back down to a level which supports a value of $V_{IN}$ corresponding to $V_{UP}$.

As $V_{IN}$ decreases below the value of $V_{UP}$, $V_{OUT}$ again increases, thus causing decreased current flow through resistor 84. However, with $V_{IN}$ decreasing, the emitter current of transistor 80 and the potential drop across resistor 82 are also decreasing. Since $V_{OUT}$ is increasing and $V_{IN}$ is decreasing, the Schottky barrier diode 88 rapidly approaches a non-conductive state and drastically reduces the current flow through resistor 90. Decreasing current flow through resistor 90 tends to drive $V_{IN}$ more positive. Simultaneously therewith, decreasing current flow through resistor 82 tends to drive the emitter of transistor 80 more negative, and consequently, the base-to-emitter voltage of transistor 88 is increased by a push-pull effect and forces the emitter current back up to a level which supports the value of $V_{IN}$ to that corresponding to $V_{UP}$.

The stable mode of operation of this circuit tends to compensate for loading effect and component variations. As additional loads are added to a point corresponding to either node or terminal 24 in FIG. 1 or terminals 94 and 96 in FIG. 2, the total load current remains relatively constant, i.e., the current per load becomes a function of the number of loads in parallel and decreases in proportion to this number. The table below illustrates this phenomenon and its effect on $V_{IN}$, where the load current is deemed to be the current flowing through resistor 16 in FIG. 1 or resistor 90 in FIG. 2.

| Number of Loads | Load Current | Current Per Load | $V_{IN}$ |
|---|---|---|---|
| 1 | 0.51 ma. | 0.51 ma. | 0.995V. |
| 2 | 0.57 ma. | 0.285 ma. | 0.965V. |
| 3 | 0.59 ma. | 0.196 ma. | 0.955V |
| 4 | 0.60 ma. | 0.15 ma. | 0.950V |
| 5 | 0.61 ma. | 0.122 ma. | 0.945V |
| 10 | 0.63 ma. | 0.063 ma. | 0.935V |

A somewhat similar situation exists when a low base-to-collector current gain (beta) transistor is substituted for a high beta transistor in the circuits of FIGS. 1 and 2. In one instance, a beta of 100 resulted in a load current of 0.484 ma. and a $V_{IN}$ of 1.008V. With another transitor device having a beta of 20 substituted therefor, the load current went down to 0.461 ma. and the $V_{IN}$ went up to a value of 1.019 V. These results were unexpected since lower betas normally result in higher load currents and lower input levels. However, in this particular circuit example, the majority of load current is constituted by the current flow in the Schottky barrier diode. With an attendant reduced collector current as a result of the use of a lower gain transistor, a higher level of output voltage, $V_{OUT}$, is established, which in turn is fed back to the input terminal of the bipolar transistor through the diode itself.

The bistable logic circuit of the present invention also compensates for resistor value variations. For example, decreasing the value of resistor 34, FIG. 1, by 20 percent to 400 ohms results in an upward shift in the up level at output terminal 24 to a more positive value by only about .025 V, and an output down level shift at output terminal 60 in a positive direction by only about .03 V, providing other circuit parameters remain constant. Compensation also takes place when transistor 28 is in a conducting state in that the current flow through Schottky barrier diode 42 only decreases .05 miliamps whereas the emitter current flow through transistor 28 increases about .25 milliamps. As a result, the bias voltage across the base-to-emitter junction of transistor 28 is increased and thus more current is drawn through resistor 34 so as to maintain the down level on the output line or terminal 60.

Figure 4:
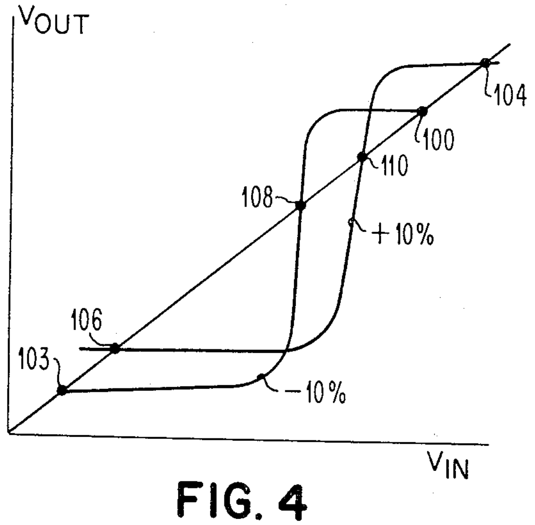
FIG. 4 is a voltage plot illustrating a two-stage gain curve characteristic for different valued power supplies.

The basic bistable circuit of the present invention yet affords another advantage with respect to signal swing and gain. Since the up level is essentially the anode voltage of the Schottky barrier diode, and the down level is the cathode voltage of the Schottky barrier diode, the signal swing is equal to the conducting voltage of the Schottky barrier diode and thus tends to remain constant as circuit parameters and power supply voltages vary. The in-phase curves resulting from the cascading of two out-of-phase circuits constructed according to the basic invention are illustrated in FIG. 4 and demonstrate the effect of power supply variations. Points 100 and 103, and points 104 and 106 represent stable up and down voltage levels for a −10 and a +10 percent power supply variation, respectively. For the circuit described in FIG. 1, the difference in potential between point 100 and point 103 is 0.490 V, and the difference in potential between points 104 and 106 is 0.535 V, or a change of 0.0450 V for a power supply variation of 0.25 volts. The up signal noise tolerance level is the potential difference between the upper two crossing points on each curve, that is, between point 100 and a point 108, and between point 104 and a point 110 which remains relatively constant at 0.14 volts for the −10 percent curve and at about 0.17 volts for the +10 percent curve.

Figure 5:
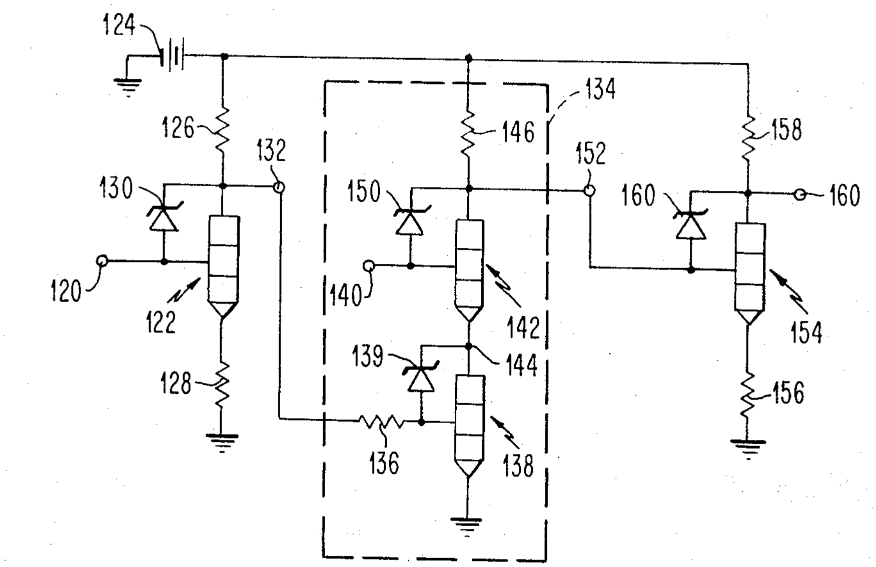
FIG. 5 is an electrical schematic diagram illustrating the substitution of a NAND block as the intermediate stage previously shown as a NOR block in FIG. 1.

Now referring to FIG. 5, it illustrates a variation of the circuit illustrated in FIG. 1 in that now the intermediate stage comprises a NAND logic circuit.

An input logic signal is applied at the first stage at input terminal 120 connected to the base terminal of a transistor 122. The collector terminal of transistor 122 is connected to a power supply source 124 via a resistor 126. The emitter terminal of transistor 122 is connected to ground potential through resistor 128. A Schottky barrier diode 130 is connected across the base-to-collector terminals of the transistor 122. An output terminal 132 connects to the intermediate NAND circuit depicted at 134, and more specifically, connects via a resistor 136 to the base terminal of transistor 138. A Schottky barrier diode 139 between the base and collector of transistor 138 is optional depending on design requirements. Transistor 138 will saturate if it is omitted. The intermediate stage is adapted to receive another logic input signal at input terminal 140 connected to the base of transistor 142. The emitter of transistor 142 is connected to the collector of transistor 138 via line 144, and the emitter of transistor 138 is connected directly to ground potential. The collector terminal of transistor 142 is connected to the supply 124 through a resistor 146. Similarly, a Schottky barrier diode 150 is connected across the base-to-collector terminals of transistor 142. An output terminal 152 connected to the collector of transistor 142 supplies an input signal to the output stage.

The output stage comprises a bipolar transistor 154 having its emitter terminal connected to ground potential through a resistor 156. The collector terminal of transistor 154 is connected to the power supply 124 via resistor 158. A Schottky barrier diode 160 is connected across the base-to-collector terminals of transistor 154. An output signal is delivered from the final stage on output terminal 160 connected to the collector terminal of transistor 154.

Operationally, with a down level signal applied to the base terminal of transistor 122, its base-to-emitter potential is sufficiently low so as to maintain it in a non-conductive state, and therefore Schottky barrier diode 130 is also non-conducting. The potential at output terminal 132 is free to rise towards the potential level of power supply 124 until a time at which transistor 138 begins conducting. As transistor 138 begins conducting (and going into saturation if Schottky barrier diode 139 is omitted), current flows into its base terminal and the anode of Schottky barrier diode 139 via resistor 136, thus creating a potential difference across resistor 126 so as to limit the ultimate potential generated at output terminal 132 to a value somewhat below that of the power supply 124. The value of resistor 136 is selected in order to develop a voltage at output terminal 132 which is equal to the voltage level developed at output terminal 24 in FIG. 1. The potential developed at terminal 132 thus represents the up level signal to the intermediate NAND logic circuit 134.

With an up level applied at terminal 132, and an up level signal applied to input terminal 140, both transistors 142 and 144 are conducting, and thus the potential at output terminal 152 falls to a level representative of a binary down level. When a down level signal is applied to output terminal 152, the base-to-emitter potential of output transistor 154 is sufficiently low so as to maintain it in a non-conductive state, and thus the third stage possesses identical voltage and current characteristics as the first stage, assuming that the output terminal 160 is connected to the base of a transistor in a similar stage, and all the components have similar electrical characteristics.

The following specifications are provided as an illustration of the magnitude and direction of the parameters of the circuit of FIG. 5, only for the purpose of aiding in the understanding of the present invention. For this particular example, Schottky barrier diode 139 was omitted and transistor 138 was allowed to saturate. They should not be construed as a limitation on such circuitry, or as representing an optimum design. Transistors 122, 142, 138, 154 . . . NPN, $f_t > 0.6$ GHZ, with a maximum of 0.85 volt, base to emitter voltage drop with 2 milliamperes collector current, and a $V_{cbmin}$ of −.66 volts at 3 milliamperes emitter current with 0.15 milliamperes of current flowing into the base.
Diodes 130, 150, 160 – Cu-Al to Si Schottky type with a maximum anode to cathode voltage drop of 0.51 volts at 0.5 ma. diode current.

| | |
|---|---|
| Supply 124 | 1.25 volts |
| Resistors, 126, 146, 158 | 500 ohms |
| Resistors, 128, 156 | 100 ohms |
| Resistor 136 | 300 ohms |
| Up level at terminals 132, 140 | 1.02 volts |
| Down level at terminals 120, 152, 160 | 0.530 volts |
| Delay of NAND block (terminals 132 to 152, positive going signal of 132 | 3.5 nsec. |
| Delay of NAND block terminals 132 to 152, negative going signal on 132 | 7.0 nsec. |

Figure 6:
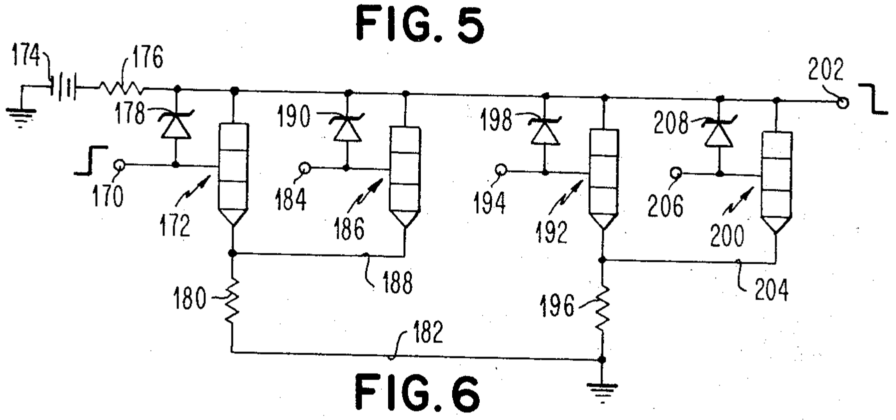
FIG. 6 is an electrical schematic diagram illustrating a modification of the basic invention extended to provide additional NOR logic inputs.

Now referring to FIG. 6, it illustrates a variation of the basic circuit wherein a single collector-resistor is employed in conjunction with two emitter-resistors in order to form a 4-way NOR block. This modification is particularly suitable for LSI applications due to the ease of wiring or interconnection to a common collector conductor as opposed to a plurality of parallel transistors.

The circuit receives an input signal at input terminal 170 connected to the base terminal of an input transistor 172. The collector terminal of transistor 172 is connected to a power supply 174 via a resistor 176. A Schottky barrier diode 178 is connected across the base-to-collector terminals of transistor 172. The emitter terminal of transistor 172 is connected to ground potential via resistor 180 and line 182. The circuit is adapted to receive another logic input signal at terminal 184 connected to the base terminal of another bipolar transistor 186. The emitter terminal of 172 is directly connected to the emitter terminal of transistor 186 by means of line 188. A Schottky barrier diode 190 is connected across the base-to-collector terminals of transistor 186.

Another input transistor 192 is adapted to receive a logic input signal at input terminal 194 connected to its base terminal. The emitter terminal of transistor 192 is connected to ground potential through resistor 196. A Schottky barrier diode 198 is connected across the base-to-collector terminals of transistor 192. An output bipolar transistor 200 is connected at its collector terminal to a common output line 202, and its emitter terminal is directly connected via line 204 to the emitter terminal of transistor 192. The output transistor 200 receives an input logic signal on line 206 connected to its base terminal. A Schottky barrier diode 208 is connected across the base-to-collector terminals of transistor 200.

The operation of this circuit is similar to that previously described with respect to the circuitry of FIG. 1. When transistor 172 associated with resistor 180, and transistor 192 associated with resistor 196, are conducting current simultaneously, the down level on output line 202 is approximately 0.08 volts lower than the down level for the NOR block illustrated in FIG. 1, assuming identical circuit parameters are employed.

Figure 7:
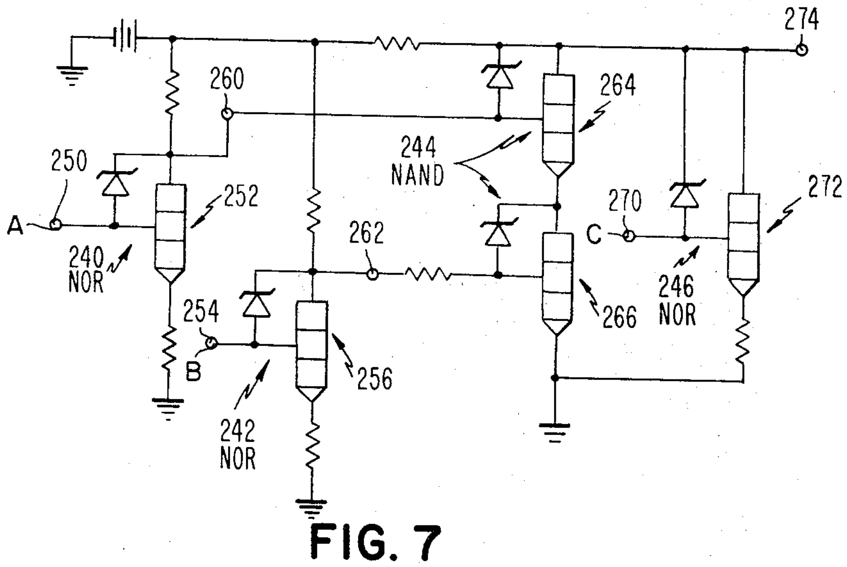
FIG. 7 is an electrical schematic diagram illustrating the combination of NOR, NAND, and extended NOR circuits constructed according to the basic invention which can be employed for certain desired logic applications.

Now referring to FIG. 7, it illustrates a logic circuit application wherein different forms of the basic logic circuit can be intermixed, thus illustrating the versatility of the present invention. The overall circuit comprises a pair of input NOR circuits 240 and 242, interconnected to a NAND circuit 244. A NOR extension circuit 246 is connected to the output of the NAND circuit 244.

The specific details of the intermixed circuit of FIG. 7 are not given since the structure and operation have been previously described in great detail with respect to FIGS. 1 through 6. However, briefly, an input terminal 250 applies a logic signal to the base of transistor 252 associated with the input NOR circuit 240. An input terminal 254 applies an input logic signal to the base of transistor 256 associated with the NOR circuit 242. Input signals to the NAND circuit 244 are applied via terminals 260 and 262 interconnected to the base terminals of NAND transistors 264 and 266.

A logic input signal is applied to terminal 270 connected to the base terminal of transistor 272 associated with the output NOR extension circuit 246. A resulting logical function is generated on output terminal 274 from the intermixed logic circuits.

Operatively, with a binary signal A applied to terminal 250, a binary B signal applied to terminal 254, and a binary C signal applied to terminal 270, the logical $\overline{\overline{A} \cdot \overline{B} + C}$ is generated on output terminal 274.

Figure 8:
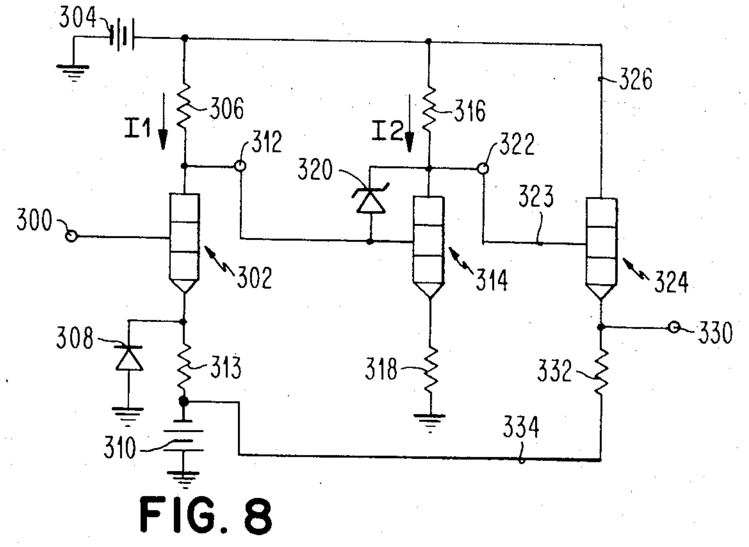
FIG. 8 is an electrical schematic diagram illustrating an application of the basic internal logic circuit in combination with a current switch type receiver and an emitter-follower driver, which is particularly suited for large scale integrated circuit application.

Now referring to FIG. 8, it illustrates an LSI application wherein a receiver circuit located on a semiconductor chip comprises a basic current switch circuit which in turn drives an on-chip transistor switching circuit constructed according to the present invention. The input current switch circuit comprises an input terminal 300 connected to the base terminal of current switch transistor 302. The collector of transistor 302 is connected to a power supply 304 via resistor 306. The emitter terminal of transistor 302 is connected to the cathode of a diode 308 whose anode is further connected to ground potential. The emitter terminal of transistor 302 is also connected to a supply 310 via resistor 313. An output signal from the input stage is developed at output terminal 312 which in turn applies an input signal to the base terminal of bipolar transistor 314. The collector terminal of transistor 314 is connected to supply 304 by means of resistor 316, and its emitter terminal is connected to ground potential through resistor 318. As previously described with respect to the basic invention, a Schottky barrier diode 320 is connected across the base-emitter terminals of transistor 314. An output signal is generated on output terminal 322, connected to the collector of transistor 314, which in turn is connected via line 323 to the base terminal of output transistor 324. The collector of output transistor 324 is connected to the supply 304 via line 326, and its emitter terminal is connected to an output terminal 330 and to supply 310 by means of resistor 332 and line 334. The emitter follower output stage transistor 376 provides the driving capability necessary to drive relatively large amounts of capacitance or the relatively low characteristic impedance of a transmission line, and would therefore normally be used when communicating off the semiconductor chip.

Resistor 306 in the input circuit is selected to have an equivalent value to resistor 316 constituting a portion of the basic internal logic circuit of the present invention. Accordingly, when input transistor 302 is in a non-conducting state, the binary up level at output terminal 312 is of an identical value to that internally established at node 322 when transistor 314 is not conducting.

The value of resistor 313 is appropriately selected so as to establish current I1 when transistor 302 is conducting equal to current I2 when transistor 314 is conducting. Since resistor 306 is equivalent in value to resistor 316, the down level generated at output terminal 312 is identical to that at node 322 when transistor 314 is conducting. The output signal generated at output node 322 is translated downwardly by a value equal to the base-to-emitter voltage drop of the emitter-follower output circuit constituted by transistor 324. By appropriately selecting the value of resistor 332, the signal swing at output terminal 330 can be centered with respect to ground potential, which is the reference potential to the basic input current switch. The output at terminal 330 is thus compatible with the input signal applied to input terminal 300.

In practice, any number of stages and variations thereof of the basic logic circuit of the present invention can be interposed between the input current switch receiver represented by input transistor 302 and the emitter-follower output driver represented by transistor 324. This is extremely useful in large scale integration circuit applications because the basic internal circuits operate at speeds which are compatible with the input current switch. Thus, speed performance is not sacrificed while reduced power dissipation is attained in LSI implementation.

Figure 9:
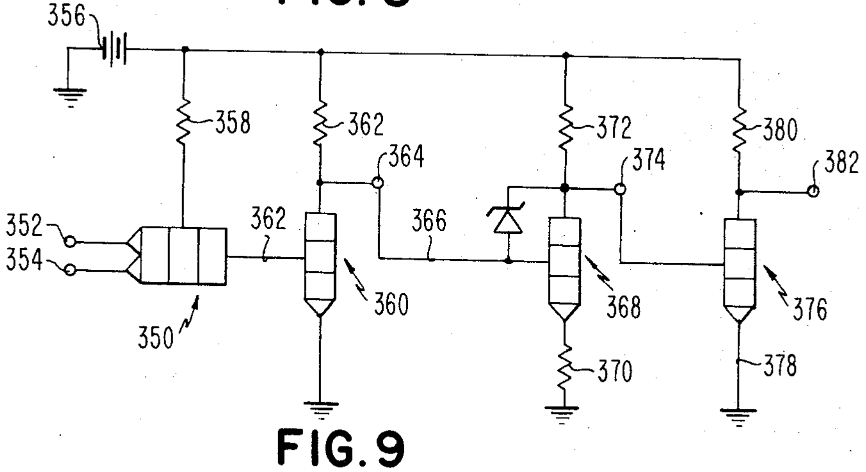
FIG. 9 is an electrical schematic diagram illustrating an application of the basic internal logic circuit of the present invention in combination with a T²L receiver and a saturated transistor driver output stage for use in large scale integrated circuit applications.

Now referring to FIG. 9, it illustrates a LSI application wherein the input chip receiver circuit comprises a transistor-transistor logic ($T^2L$) circuit which drives a basic internal circuit of the present invention. The input circuit comprises a basic multi-emitter coupling transistor 350 adapted to receive logic signals on a pair of input terminals 352 and 354. The base of transistor 350 is connected to a power supply 356 via a resistor 358. An output transistor 360 is connected via its base terminal 362 to the collector terminal of transistor 350. The emitter of transistor 360 is connected to ground potential, and the collector is connected to the supply 356 via resistor 362. A $T^2L$ logic signal is generated on output terminal 364 connected to the collector of $T^2L$ output transistor 360. The input $T^2L$ circuit is connected to the basic internal logic circuit of the present invention via line 366 which connects to the base terminal of transistor 368. The emitter of transistor 368 is connected to ground potential through resistor 370. The collector of transistor 368 is connected to the supply 356 via resistor 372. An output terminal 374 connected to the collector of transistor 368 provides an input signal to an output transistor 376 whose emitter is connected directly to ground potential by means of line 378 and whose collector terminal is connected to the supply 356 by means of resistor 380 and to an output terminal 382.

The basic internal logic circuit essentially comprising transistor 368 and its attendant elements is capable of driving the saturated output transistor 376 which is used to drive an off-chip circuit. The saturated output transistor 376 and pull-up resistor 380 comprise an output stage with the driving capability necessary to drive relatively large amounts of capacitance, and would therefore normally be used when communicating off the semi-conductor chip. The value of resistor 362 in the input $T^2L$ circuit is selected to be of the same value as resistor 372 in the basic internal logic circuit in order to insure that when transistor 360 is non-conducting, the up level generated at output terminal 364 is identical to that at node 374 when transistor 368 is not conducting. The value of resistor 380 in the output stage is selected according to power dissipation and time constant requirements, although its particular value is not critical to a static mode of operation.

Again, any number of stages and variations thereof, of the basic invention can be interconnected between the input $T^2L$ circuit and the output transistor 376.

Figure 10:
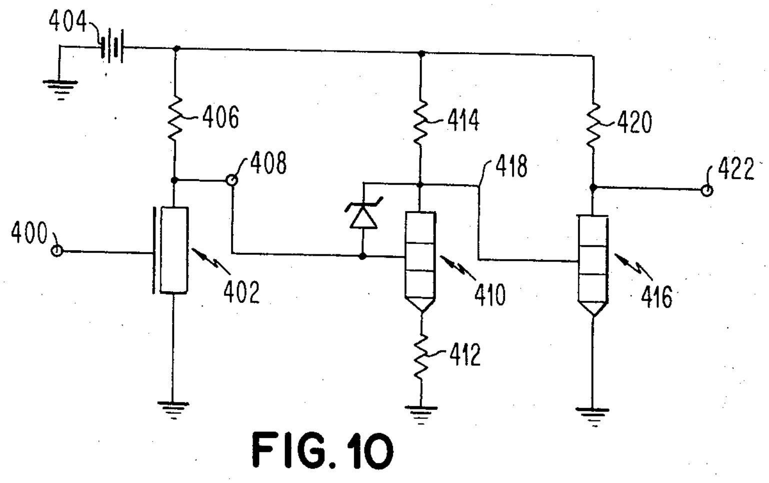
FIG. 10 is an electrical schematic diagram illustrating the combination of an FET driver circuit for driving the basic internal logic circuit of the present invention, and an output bipolar saturated driver capable of driving another FET circuit, particularly advantageous when intermixing field effect transistors and bipolar devices in large scale integrated circuits.

Now referring to FIG. 10, it illustrates the capability of the basic logic circuit of the present invention to be intermixed with field effect transistors (FET). The input stage is adapted to receive an input signal on terminal 400 connected to the gate terminal of FET device 402. The drain terminal of FET device 402 is connected directly to ground and the source terminal is connected to a supply 404 via resistor 406. The input stage generates an output signal on terminal 408 connected to the source terminal of FET device 402.

Again, the intermediate stage comprises bipolar device 410 whose emitter terminal is connected to ground potential by means of resistor 412 and whose emitter collector terminal is connected to the supply 404 by means of a resistor 414.

The basic internal logic circuit of the present invention provides an input signal to the output stage transistor 416 via line 418 connecting the collector terminal of transistor 410 to the base terminal of transistor 416. The emitter terminal of transistor 416 is directly connected to ground potential, and its collector terminal is connected to the supply 404 via resistor 420. An output signal is generated on output terminal 422 connected to the collector terminal of transistor 416.

In this circuit, a field effect tranaistor is driving directly into the base terminal of transistor 410 by means of pull-up resistor 406. By properly selecting resistor values, the FET power supply voltage can also be employed as a common power supply for the remaining bipolar circuits interconnected thereto. Power supply 404 can be selected to have a value of 8.0 volts or greater.

The value of resistors 406 and 414 should be selected to have equal values and be in the order of 5–8kilo ohms in order to minimize power dissipation to a level which is in the range of a few milliwatts per circuit. The value of resistor 412 can be selected to be in the range of 100 ohms, as in the circuit of FIG. 1, if the emitter current is at a substantially identical level.

The output driver transistor 416 operates in a saturated mode, and thus the value of pull-up resistor 420 is not critical to the static operation of the circuit; however, its optimum value can be selected in order to minimize power dissipation and satisfy time constant requirements.

Again, any number of stages can be interconnected between the FET input stage and the output transistor 416, corresponding to a receiver and driver, as previously discussed. Accordingly, this circuit variation provides the ability to intermix the bipolar circuits with FET circuits without hindering circuit performance.

In summary, it can be seen that the basic logic circuit of the present invention substantially maintains the conduction level of the bipolar transistor constant for varying signal perturbations at its associated base input terminal so as to generate a stable output signal at its associated output terminal when the diode connected between its base and collector terminal is conducting.

With terminals 94 and 96 closed, FIG. 2, the operation of the two negative feedbacks in the basic logic circuit is mathematically stated as follows:

$$V_{IN} = V_{BE} + I_E R_{82}$$

$$V_{IN} = E_{86} - (I_s + I_b) R_{90}$$

$$V_{BE} = V_{IN} - I_E R_{82}$$

$$V_{BE} = E_{86} - (I_s + I_b) R_{90} - I_E R_{82}$$

Thus, if signal perturbations cause $V_{UP}$ to rise by virtue of varying $V_{IN}$, then both $I_s$ and $I_E$ go up so as to reduce the base to emitter voltage $V_{BE}$ and return the input voltage $V_{IN}$ to a lower level or back to its stable $V_{UP}$ state. Similarly, if $V_{IN}$ goes down, then $I_s$ and $I_E$ go down so as to raise the value of $V_{BE}$ and, accordingly, raise the value of $V_{IN}$ upwardly to its $V_{UP}$ stable state.

Although not shown, it is quite clear that terminal 54 (FIG. 1), terminals 120, 140 (FIG. 5), terminals 170, 184, 194, 206 (FIG. 6), etc., are driven from a collector node from a previous stage. Such a collector node is connected to a resistor and power supply in order to provide desired voltage levels and a concurrent feedback path for the pair of negative feedback paths associated with the basic logic circuit, previously described in detail in connection with FIG. 2.

It is to be observed that in the NAND function implementations, illustrated in FIGS. 5 and 7, the emitter impedances for the basic logic circuit transistors 142 and 264 comprise active devices, namely, transistors 138 and 266, respectively. In the NOR implementation of FIG. 6, the common collector resistor 176 is shared by all the transistors 172, 186, 192, and 204, and emitter impedances, specifically resistors 180 and 196 are shared by transistor pairs 172, 186 and 192, 200, respectively.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. A logic circuit including:

A. a plurality of interconnected stages, at least one stage being constituted by a basic logic circuit for maintianing transistor conduction levels substantially constant for varying base input signal perturbations so as to generate stable collector output signals, wherein said basic logic circuit comprises:

a. a first bipolar transistor having base, collector, and emitter terminals, b. a first non-linear impedance unidirectional current conducting means connected across said base to collector terminals of said first bipolar transistor, and comprising a first negative feedback path, c. a second impedance being adapted for connecting said collector terminal to a power supply, d. a third impedance connected to said emitter terminal and comprising a second negative feedback path, B. a fourth impedance associated with one of said other plurality of interconnected stages and being adapted to connect said base terminal to a power supply, said base terminal being concurrent to said first and second negative feedback paths, whereby C. input signal perturbations at said base terminal varying from a desired conductive level are compensated by said first and second negative feedback paths so as to generate relatively stable logic output signals at said collector terminal.

2. A logic circuit as in claim 1 wherein:

A. said plurality of interconnected stages include at least two of said basic logic circuits.

3. A logic circuit as in claim 1 wherein:

A. said first non-linear impedance comprises a diode, and

B. said second, third, and fourth impedances comprise resistors.

4. A logic circuit as in claim 1 wherein:

A. said plurality of interconnected stages include at least two of said basic logic circuits, and comprise, B. a said first basic logic circuit connected to a said second basic logic circuit, wherein the collector terminal of said first basic logic circuit is connected to the base terminal of said second basic logic circuit, and C. said fourth impedance of said second basic logic circuit is constituted by said second impedance of said first basic logic circuit.

5. A logic circuit as in claim 4 wherein:

A. said plurality of interconnected stages include at least three of said basic logic circuits, and comprise, B. a said third basic logic circuit connected to said second basic logic circuit, wherein the collector terminal of said second basic logic circuit is connected to the base terminal of said third basic logic circuit, and C. said fourth impedance of said third basic logic circuit is constituted by said second impedance of said second basic logic circuit.

6. A logic circuit as in claim 5 wherein:

A. said second basic logic circuit further includes a fourth basic logic circuit, B. said respective collector terminals; and said respective emitter terminals of said second and fourth basic logic circuits being directly interconnected so that said second and third impedances are common to said pair of collector terminals and to said emitter terminals, respectively, whereby C. said second and fourth basic logic circuits provide a NOR function in response to input signals at their respective base terminals.

7. A logic circuit as in claim 4 wherein:

A. said plurality of interconnected stages include at least three of said basic logic circuits, and comprise, B. a said third basic logic circuit connected to said first basic logic circuit, said base terminal of said third basic logic circuit being connected to an associated said fourth impedance means independent of said first and second basic logic circuits.

8. A logic circuit as in claim 7 wherein:

A. said first basic logic circuit further comprises a second bipolar transistor connected to said first bipolar transistor of said first basic logic circuit, B. said collector terminal of said third basic logic circuit being connected to the base terminal of said second bipolar transistor, and C. said third impedance means of said first basic logic circuit comprising said second bipolar transistor, whereby said first basic logic circuit is responsive to provide a NAND function.

9. A logic circuit as in claim 1 wherein:

A. said plurality of interconnected stages comprise a plurality of said basic logic circuits wherein a. each of their said associated second impedances are constituted by a common impedance connected between their mutually connected collector terminals and a power supply, b. said plurality of associated fourth impedances being independent of said plurality basic logic circuits, whereby B. said plurality of basic logic circuits provide a NOR function at an output terminal connected to the mutually connected collector terminals.

10. A logic circuit as in claim 9 wherein:

A. at least a pair of said emitter terminals associated with two of said plurality of basic logic circuits are directly interconnected so that their said associated third impedances are constituted by a common impedance connected to said pair of emitter terminals.

11. A logic circuit as in claim 1 wherein:

A. said plurality of interconnected stages include at least first, second, and third stages, wherein, a. said first stage comprises at least two of said basic logic circuits adapted to provide a NOR function, b. said second stage comprises at least two of said basic logic circuits adapted to provide a NAND function, and c. said third stage comprises at least one said basic logic circuit adapted to provide a NOR function.

12. A logic circuit as in claim 1 wherein:

A. said plurality of interconnected stages further include a current switch stage comprising a current switch bipolar transistor connected to said basic logic circuit, and B. said fourth impedance associated with said basic logic circuit being connected to the collector terminal of said current switch bipolar transistor.

13. A logic circuit as in claim 12 wherein:
A. said plurality of interconnected stages further include a third stage connected to said basic logic circuit,
B. said third stage comprising a third bipolar transistor having its base terminal connected to said collector terminal of said basic logic circuit and its emitter terminal connected to an output terminal for providing an emitter follower output signal.

14. A logic circuit as in claim 1 wherein:
A. said plurality of interconnected stages further includes a first $T^2L$ stage comprising a $T^2L$ output bipolar transistor connected to said basic logic circuit, and
B. said fourth impedance associated with said basic logic circuit being connected to the collector terminal of said $T^2L$ output bipolar transistor.

15. A logic circuit as in claim 14 wherein:
A. said plurality of interconnected stages further includes a third stage connected to said basic logic circuit and comprising an output bipolar transistor having its base terminal connected to said collector terminal of said basic logic circuit, and
B. an output terminal connected to the collector terminal of said output bipolar transistor.

16. A logic circuit as in claim 1 wherein:
A. said plurality of interconnected stages includes a first field-effect-transistor stage connected to the base terminal of said basic logic circuit, and
B. said fourth impedance associated with said basic logic circuit is constituted by an impedance connected to one of the terminals of said field-effect-transistor stage.

17. A logic circuit as in claim 16 wherein:
A. said plurality of interconnected stages further includes a third stage connected to said basic logic circuit and comprising an output bipolar transistor having its base terminal connected to said collector terminal of said basic logic circuit, and
B. an output terminal connected to the collector terminal of said output bipolar transistor.

* * * * *